(12) United States Patent
DeVries (10) Patent No.: US 9,242,805 B2
(45) Date of Patent: Jan. 26, 2016

(54) SCRAPER BLADE FOR CONVEYOR BELTS

(71) Applicant: Flexible Steel Lacing Company, Downers Grove, IL (US)

(72) Inventor: Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 14/229,800

(22) Filed: Mar. 28, 2014

(65) Prior Publication Data

US 2015/0274434 A1 Oct. 1, 2015

(51) Int. Cl.
*B65G 45/12* (2006.01)
*B65G 45/14* (2006.01)

(52) U.S. Cl.
CPC ..................... *B65G 45/14* (2013.01)

(58) Field of Classification Search
CPC .............................. B65G 45/12; B65G 45/16
USPC .................................................. 198/497, 499
See application file for complete search history.

(56) References Cited

U.S. PATENT DOCUMENTS

| | | | |
|---|---|---|---|
| 4,658,949 A | 4/1987 | Reicks | |
| 4,917,231 A | 4/1990 | Swinderman | |
| 4,953,689 A | 9/1990 | Peterson et al. | |
| 5,197,587 A * | 3/1993 | Malmberg | 198/497 |
| 5,222,589 A | 6/1993 | Gordon | |
| 5,979,638 A * | 11/1999 | Wiggins | 198/497 |
| 6,056,112 A | 5/2000 | Wiggins | |
| 6,082,524 A | 7/2000 | Brink | |
| 6,315,105 B1 | 11/2001 | Gibbs et al. | |
| 6,321,901 B1 | 11/2001 | Strebel et al. | |
| 6,349,816 B1 | 2/2002 | Tenzer et al. | |
| D482,508 S | 11/2003 | DeVries | |
| 6,926,133 B2 * | 8/2005 | Kolodziej et al. | 198/498 |
| 7,347,315 B2 | 3/2008 | Kolodziel et al. | |
| D594,623 S | 6/2009 | Felton | |

(Continued)

FOREIGN PATENT DOCUMENTS

WO 2011/034553 3/2011

OTHER PUBLICATIONS

ConShear Retrofit Replacement Blades for OEM Belt Cleaners Part Number Cross-Reference Guide, copyright date 2008, 11 pages.

(Continued)

*Primary Examiner* — James R Bidwell
(74) *Attorney, Agent, or Firm* — Fitch, Even, Tabin & Flannery LLP (57) ABSTRACT

In one aspect, a scraper blade for a conveyor belt is disclosed that provides improved strength and durability of a connection between a resilient blade body and an insert molded in situ with the blade body. The blade body has an upper portion with a scraping tip and a lower portion with a pair of laterally spaced depending leg portions. The insert has a pair of laterally spaced side wall portions with variable wall thicknesses and laterally outwardly facing sides that extend along laterally inwardly facing sides of the blade body leg portions. Each insert side wall portion and the blade body lower portion include a plurality of recesses having an undercut configuration and a plurality of projections extending laterally and filling the corresponding recesses in which the projections are received to keep the blade body and the insert connected together under loading during conveyor belt operations.

34 Claims, 9 Drawing Sheets

(56) References Cited

U.S. PATENT DOCUMENTS

| | | | |
|---|---|---|---|
| 8,123,022 B2 | 2/2012 | Mott et al. | |
| 8,464,858 B2 | 6/2013 | Kirschner et al. | |
| D710,564 S * | 8/2014 | Yang | D34/35 |
| 8,875,870 B2 * | 11/2014 | Waters | 198/497 |
| 2006/0131135 A1 | 6/2006 | Waters et al. | |
| 2010/0126832 A1 | 5/2010 | DeVries | |
| 2011/0220461 A1 | 9/2011 | Kirschner et al. | |
| 2012/0247922 A1 | 10/2012 | Waters | |

OTHER PUBLICATIONS

Superior Replacement Blades Part Number Reference Guide, accessed prior to Mar. 28, 2014, 5 pages.

Argonics Engineered Polyurethane Replacement Blades Technical Product Bulletin, accessed from www.argonics.com, accessed prior to Mar. 28, 2014, 10 pages.

ASGCO website, Replacement blades, accessed from www.ASGCO.com, copyright date 2014, 8 pages.

Picture of Scraper Blade from Martin Engineering, publicly available before Mar. 28 2014, 1 page.

Flexco, Belt Conveyor Products, copyright date 2013, 28 pages.

Argonics, Replacement Blades, Raptor & Accuflo Retrofit Blades, accessed prior to Mar. 28, 2014, 2 pages.

Design U.S. Appl. No. 29/486,403, filed Mar. 28, 2014, 30 pages.

Design U.S. Appl. No. 29/495,776, filed Jul. 3, 2014, 17 pages.

Notification of Transmittal of the International Search Report and the Written Opinion of the International Searching Authority, or the Declaration from the International Bureau of WIPO for corresponding International Application No. PCT/US15/23018, dated Jul. 2, 2015, 13 pages.

* cited by examiner

SCRAPER BLADE FOR CONVEYOR BELTS

FIELD OF THE INVENTION

The invention relates to conveyor belt systems and, more particularly, to scraper blades for conveyor belts.

BACKGROUND OF THE INVENTION

Scraper blades may be used to scrape material off of conveyor belts. Some conventional approaches utilize a tensioning mechanism that maintains a section of the scraper blade against the conveyor belt. In one approach, the scraper blade has a urethane tip for scraping the conveyor belt and a metal insert used for mounting the scraper blade to an elongate support member assembly that extends across the belt. The urethane tip is molded onto the metal insert by pouring molten urethane into a mold containing the metal insert and allowed to harden on the metal insert. The metal insert provides a rigid base for securely connecting the blade to the support member.

A problem with scraper blades that utilize a urethane tip molded onto a metal insert is that the loading on the urethane tip during use of the scraper blade may cause the urethane tip to separate from the metal insert. One approach for addressing this issue is to use interlocking features on the urethane tip and the metal insert. The interlocking features may include thin arms extending laterally outward from side walls of the metal insert. Once the urethane hardens on the metal insert, the arms have flat surfaces that abut the urethane and ends that dig into the urethane and restrict movement of the urethane away from the metal insert. Although the thin arms of the metal insert restrict movement of the large pieces of the urethane, some large pieces of the urethane are unsupported and may move relative to the insert due to the somewhat flexible properties of the urethane. Further, the laterally extending arms narrows the lateral thickness of the urethane tip as measured from the ends of the arms to laterally outer surfaces of scraper blade. The narrowed lateral thickness of the urethane tip reduces the strength of the urethane tip at the insert arms.

One approach for maintaining the urethane tip on the metal insert is to first prepare the metal insert by sandblasting the metal insert and spraying the metal insert with adhesive. The urethane tip is molded onto the sandblasted metal insert, with the roughened surface and the adhesive securely bonding the urethane and the metal insert together. The process of sandblasting and spraying adhesive onto the metal insert increases the number of steps and time required for the manufacture of the scraper blade, thereby also increasing its overall cost.

SUMMARY OF THE INVENTION

In accordance with one aspect of the invention, a scraper blade is provided having an improved connection strength between a blade body of resilient material and an insert molded in situ with the blade body. The blade body has a pair of laterally spaced depending leg portions and the insert has a pair of laterally spaced side wall portions. The insert laterally spaced wall portions have variable wall thicknesses and laterally outwardly facing sides that extend along corresponding inwardly facing sides of the blade body depending leg portions. The scraper blade includes a plurality of recesses in each of the insert side wall portions with an undercut configuration and a plurality of projections of the blade body lower portion that extend laterally inward and fill the corresponding recesses in which the projections are received. The plurality of recesses in each of the insert side wall portions and the projections of the blade body lower portion that extend laterally into the recesses provide multiple, robust anchor locations for the depending leg portions of the blade body to the side wall portions of the insert. The multiple anchor locations resist loading, including bending moments, applied to the blade body during conveyor belt operations which act to pull the resilient blade body leg portions away from the rigid insert side wall portions. The scraper blade herein thereby provides durability and strength of the connection between the blade body and the insert during conveyor belt operations without the need for pretreating the insert for this purpose.

In one form, the plurality of recesses include neckdown regions that face laterally outward and the projections have narrow neck portions that extend laterally inward in the neckdown regions. The recesses have enlarged recessed regions and the projections have corresponding enlarged lateral end portions in the enlarged recessed regions. The side wall portions extend vertically generally orthogonal to the laterally extending projection neck portions. This locates the projection neck portions such that the neck portions are placed primarily in tensile loading during conveyor belt operations to maximize the strength of the connection between the blade projections and the insert recesses for a blade body made of a material such as urethane which has a much higher tensile strength than flexural strength. Thus, the scraper blade is configured and arranged to subject the material of the blade body projections to the type of loading that the projections are best able to resist, which increases the durability and strength of the scraper blade.

In one form, the plurality of recesses having an undercut configuration are free of sharp corners, edges, and/or other sudden changes in geometries that capture debris during molding of the blade body onto the insert, such as dust dirt from storage of the insert. The presence of dust or other debris on a conventional metal insert as liquid blade material is poured into a mold having the conventional insert creates a surface tension on the liquid and encourages air bubbles to adhere to the debris which decreases the strength of the connection between the conventional blade and the insert. It has been discovered that the sharp corners, edges, and/or other sudden changes in the geometry of the conventional insert magnify the effect of the debris on the surface tension in the liquid blade material and further increase the likelihood of an air bubble becoming trapped between the blade and the insert of a conventional scraper blade. By contrast, the recesses of the insert side wall portions of the subject scraper blade have undercut configurations free of sharp corners, edges, and/or other sudden changes in geometry. The smooth geometry of the recesses reduces the effect of the shape of the recesses on any debris that are present in the recesses during molding of the blade body onto the insert. In this manner, the recesses having undercut configurations without sharp corners, edges, and/or other sudden changes in geometry provide a more resilient molding process that is less effected by the presence of debris in the recesses of the insert.

In accordance with another aspect of the present invention, a scraper blade for a conveyor belt is provided with an improved connection strength between a molded blade body of resilient material and an insert molded in situ with the blade. The molded blade body has a lower pair of laterally spaced leg portions and the insert has a pair of laterally spaced side wall portions with laterally outwardly facing sides that extend along corresponding inwardly facing sides of the blade body leg portions. The scraper blade has a plurality of interlocking undercut recesses and complimentary projections of the insert side wall portions and the blade body leg portions. The interlocking undercut recesses and complimentary projections are recessed laterally into the insert side wall portions to maximize the lateral thickness of the blade body leg portions. By maximizing the lateral thickness of the blade body leg portions, a larger cross-section of the molded blade body is subjected to tension and other loading during operation of the conveyor such that the molded blade is more durable.

This approach stands in contrast to some conventional scraper blades having laterally extending arms. For these conventional scraper blades the longer the laterally extending arms were, the higher the resistance to the blade pulling off of the metal insert. However, making the laterally extending arms of the insert longer would produce a corresponding narrowing of the lateral thickness of the blade between the insert laterally extending arms and outer lateral surfaces of the scraper blade. The recessed interlocking undercut recesses and projections of the blade body and the insert thereby provide both a secure connection between the blade body and the insert as well as a maximized lateral thickness of the blade leg portion which increases the durability and strength of the blade body.

In one form, the plurality of interlocking undercut recesses and complimentary projections include a plurality of interlocking recesses and projections that are recessed laterally into each of the insert side wall portions. Because the plurality of interlocking recesses and projections are recessed into each insert side wall portion, the lateral thickness of the blade leg portions may be maximized despite providing multiple anchor locations between the insert along each insert side wall portion. The maximized lateral thickness of the blade leg portions provides a wide section of blade material to transfer loading to all of the recesses and projections along each insert side wall portion.

In accordance with another aspect of the present invention, a scraper blade for a conveyor belt is provided that permits ready visual indication to a user of one or more properties of the scraper blade. The scraper blade includes a blade body of resilient material, an insert of material connected to the blade body, and cooperating portions of the blade body and the insert configured to form at least one alphanumeric character. The at least one alphanumeric character may provide information such as the manufacturer, model, or material of the blade. For example, the at least one alphanumeric character may include a number, a letter of the English language, and/or a plurality of alphanumeric characters.

In one form, one of the cooperating portions of the blade body and the insert includes a recess and the other of the cooperating portions of the blade body and the insert includes a projection extending into the recess. The recess and the projection together form the at least one alphanumeric character and may be manufactured in the respective blade body and insert by way of molding or extrusion, for example. In another approach, the insert includes a pair of side wall portions and a portion connecting the side wall portions, and the cooperating portions of the blade and the insert which form the at least one alphanumeric character include a region of the connecting portion. In some forms, the connecting portion may be positioned above a tensioning mechanism rib received between the side wall portions of the insert. The at least one alphanumeric character is thereby positioned above the rib and generally not obscured by the tensioning mechanism once the scraper blade has been connected to the rib thereof which permits ready viewing of the at least one alphanumeric character even during use of the scraper blade.

DETAILED DESCRIPTION OF THE PREFERRED EMBODIMENTS

Figure 1:
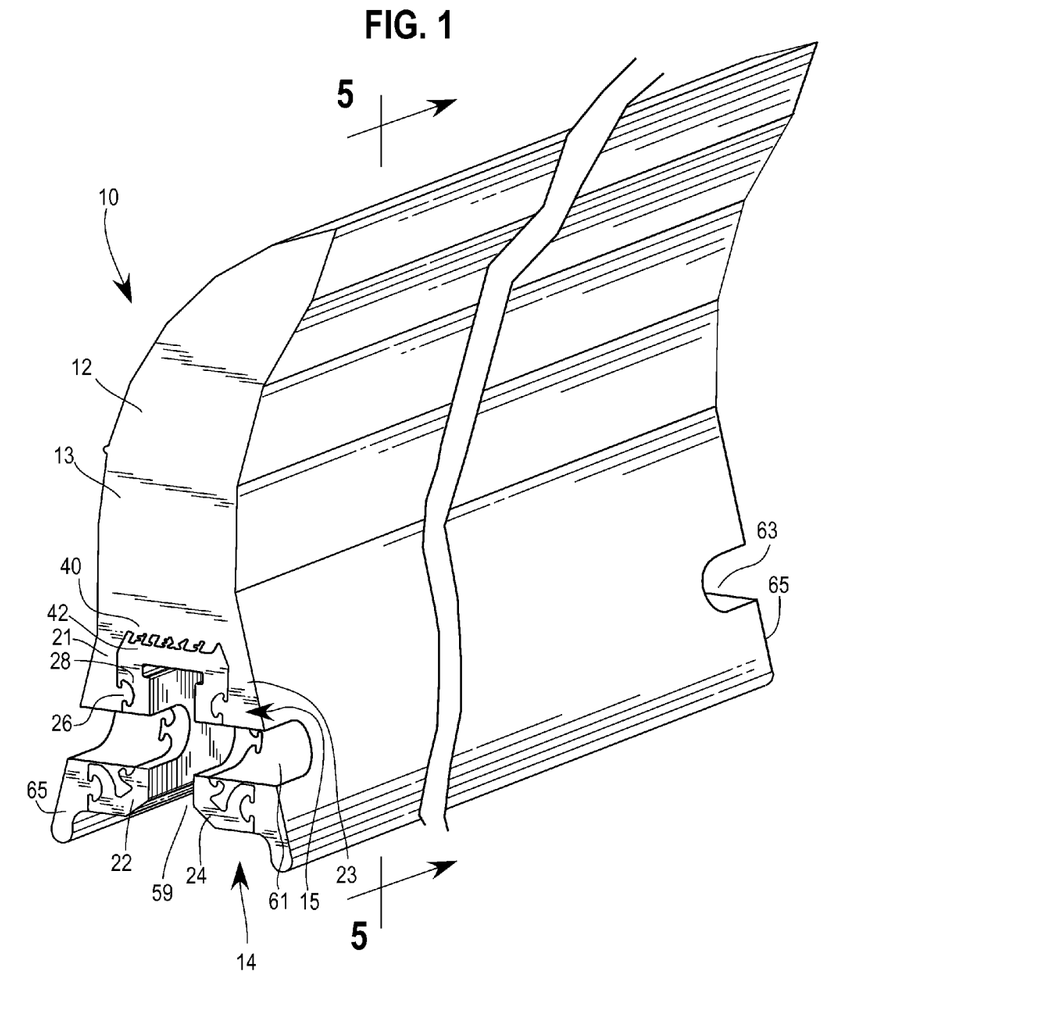
FIG. 1 is a perspective view of a scraper blade showing a blade molded on an insert.

With reference to FIG. 1, a scraper blade 10 is provided having a blade 12 with a molded body 13 of resilient material and an insert 14 of molded in situ with the blade body 13. In one embodiment, the blade 12 is made of the first material and is molded onto the insert 14 which is made of a rigid second material. By rigid, what is meant is that the structure has the ability to generally retain its respective shape during normal handling and use. For example, the blade 12 may be made of urethane or an elastomer. The insert 14 may be made of a rigid material, such as metallic material or a rigid thermoplastic. Further examples of the insert 12 material include aluminum, high-density polyethylene, and nylon, and other extruded or injection molded plastics.

Figure 2:
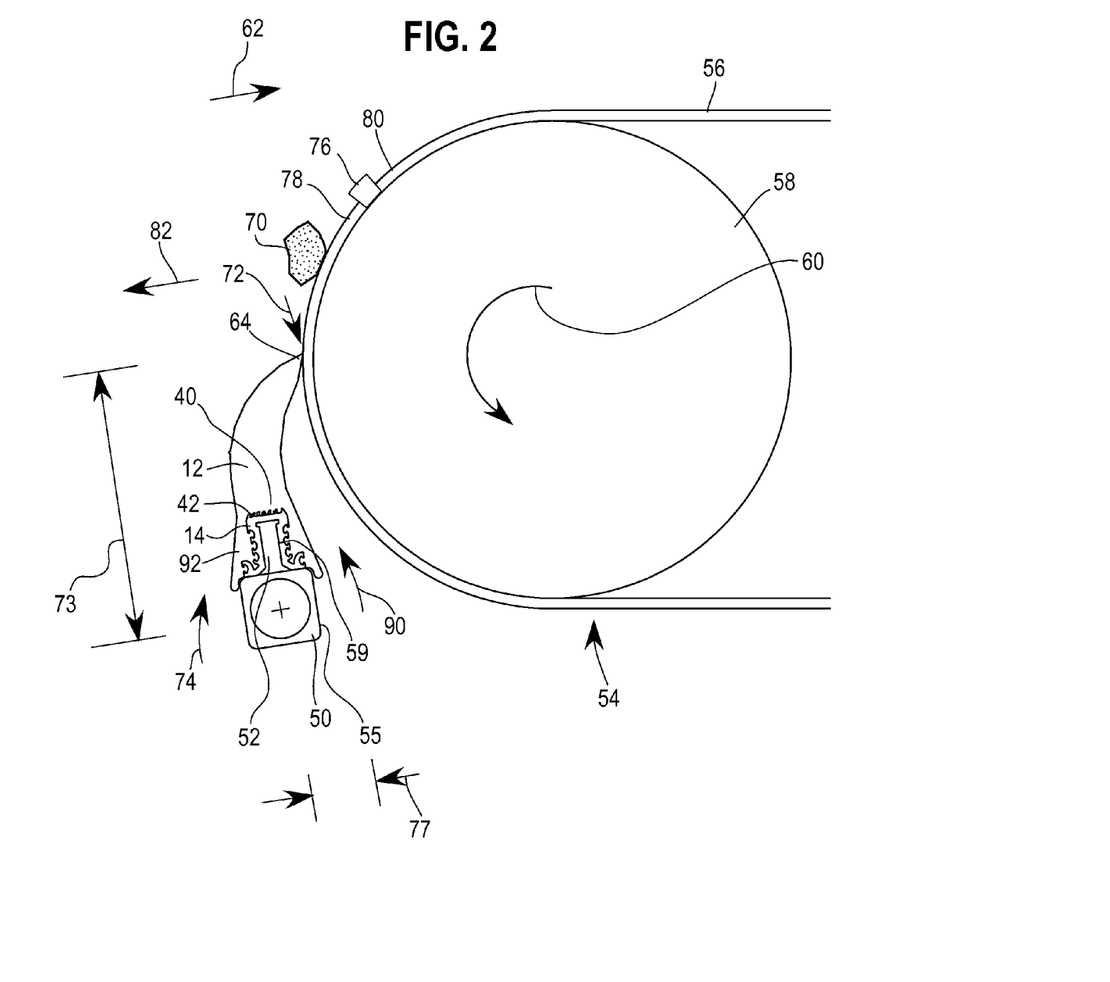
FIG. 2 is a schematic view of the scraper blade of FIG. 1 showing a tensioning mechanism holding the scraper blade against a conveyor belt.

The scraper blade 10 has an interface 15 between the blade 12 and the insert 14 that securely fixes the blade 12 with improved strength and durability over some prior scraper blades utilizing mold locking of a blade onto an insert. Further, the interface 15 provides a secure connection between the blade 12 and insert 14 without having to prep the insert 14 by sandblasting or the use of adhesive. In addition to being more robust, the scraper blade 10 includes character portions 40, 42 of the blade 12 and insert 14 that form at least one alphanumeric character. The at least one alphanumeric character permits ready visual indication of one or more properties of the scraper blade 10 and may be visible even once the scraper blade 10 has been connected to a tensioning mechanism 50, as shown in FIG. 2.

Figure 3:
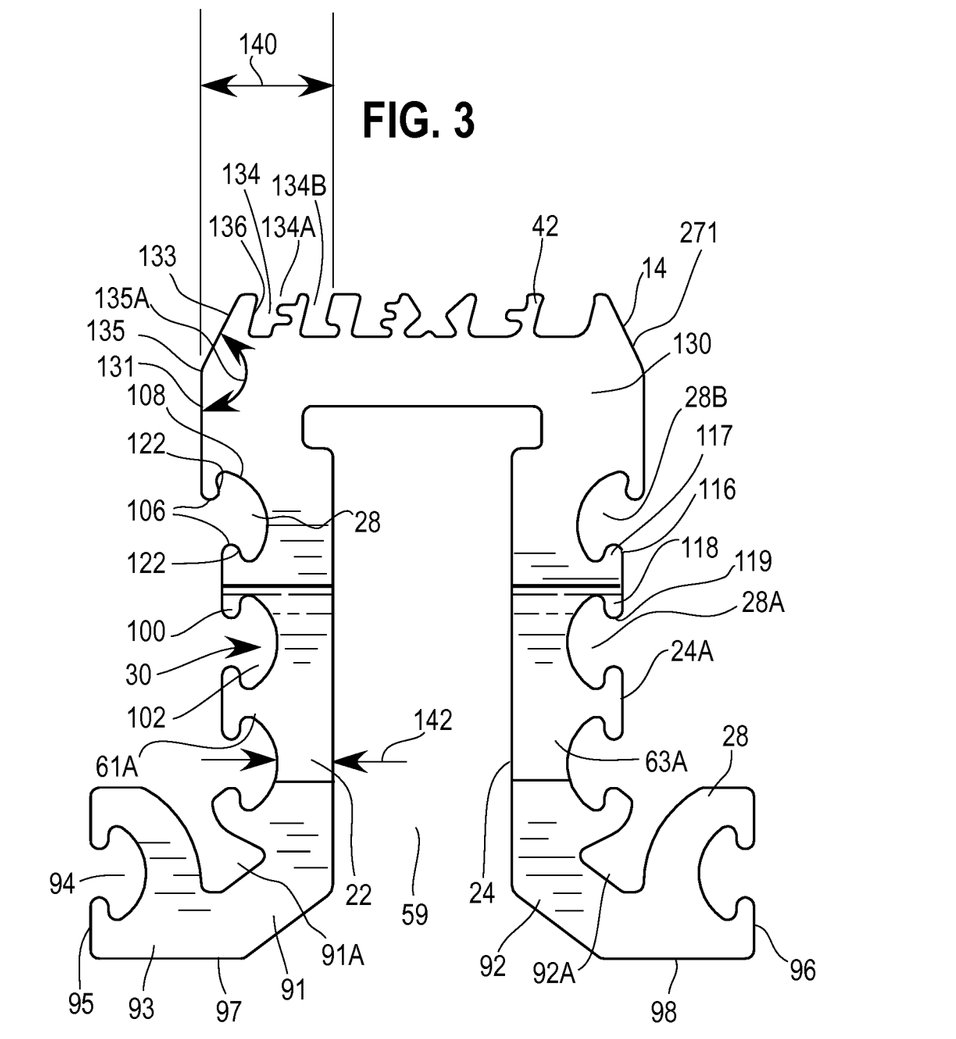
FIG. 3 is an elevational view of the insert of FIG. 1 showing recesses along side walls of the insert.
Figure 5:
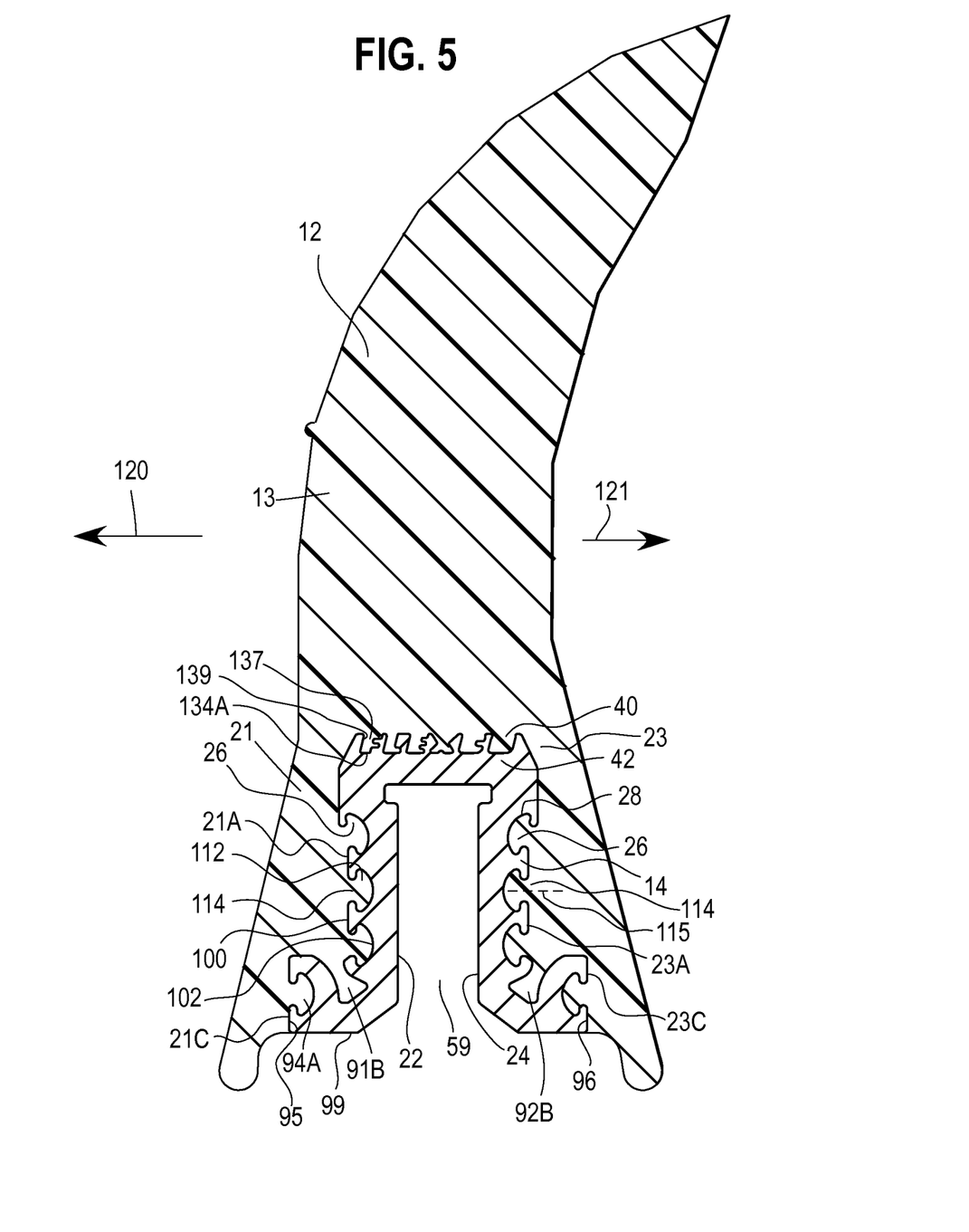
FIG. 5 is a cross-sectional view taken along line 5-5 in FIG. 1 showing the engagement between projections of the blade and the recesses of the insert.

With reference to FIGS. 1 and 3, the insert 14 has a pair of spaced side wall portions 22, 24 with laterally outward facing surfaces 22A, 24A and the blade 12 has a pair of depending leg portions 21, 23. The interface 15 includes projections 26 of the blade leg portions 21, 23 in interlocking engagement with recesses 28 of the insert side wall portions 22, 24. As shown in FIG. 5, there are multiple pairs of engaged projections 26 and recesses 28 along each of the spaced side wall portions 22, 24. The multiple pairs of engaged projections 26 and recesses 28 provide multiple points for anchoring the blade 12 to the insert 14 along each of the spaced wall portions 22, 24. These multiple anchor points resist separation of blade leg portions 21, 23 from the insert side wall portions 22, 24 along the entire lengths of the insert side wall portions 22, 24 rather than at only one location as in some conventional scraper blades. In an alternative approach, the insert 14 may include the projections 26 and the blade 12 may include the recesses 28.

With reference to FIG. 3, the insert recesses 28 have neck-down regions 100 and enlarged regions 102 that generally face laterally outwardly from the insert side wall portions 22, 24. With reference to FIG. 5, the blade projections 26 have enlarged end portions 112 received in the recess enlarged regions 102 and narrowed neck portions 114 extending in the recess neckdown regions 100. The insert recess neckdown regions 100 are configured to position the blade projection neck portion 114 such that a length axis 115 of the projection neck portions 114 are oriented generally perpendicular to the insert side wall portions 22, 24. During use of the scraper blade 10 in conveyor operations, the blade 12 is subjected to various forces and moments including loading that attempts to pull the blade legs 21, 23 in directions 120, 121 away from the insert side wall portions 22, 24, as shown in FIG. 5. Because the length axis 114 of the projection neck portions 114 are oriented to extend laterally, the loading places the projection neck portions 114 in tensile loading rather than cantilever-type loading. The blade body 13 may be made of a material having a higher tensile strength than flexural strength, such as urethane or other elastomer. By positioning the projection neck portions 114 to experience tensile loading which the projection neck portions 114 are better able to resist, the strength of each connection between the projections 26 and the recesses 28 is increased which increases the overall strength and durability of the interface 15 between the blade 12 and the insert 14.

As shown in FIG. 3, the insert 14 has dividers 116 separating the recesses 28A, 28B along the side wall portion 24. The dividers 116 include at least a portion of the neckdown regions 100 of the recess 28A, 28B. For example, the dividers 116 may have lips 117, 118 extending in opposite directions that partially define openings 119 of the recesses 28A. The dividers 116 provide an elegant approach to forming a portion of the neckdown region 100 of both recesses 28A, 28B with one structure while preserving the minimum thickness 142 of the insert side wall portions 22, 24. Further, the concave and convex surfaces 106, 108 (discussed below) along the dividers 116 are free of sharp corners or other stress risers which makes the dividers 116 and interface 15 more robust.

In one approach, the scraper blade 10 is manufactured by first extruding a metallic material from a die to form the insert 14. The extruded insert 14 includes the side wall portions 22, 24 and recesses 28 therein (although the side wall portions 22, 24 could instead have projections 26 and the blade body 13 could have the recesses 28). The recesses 28 have an undercut configuration that makes extruding the insert 14 easier due to the smooth curving geometry of the undercut configuration. In contrast, some conventional scraper blades utilize extruded metal inserts with thin, laterally extending arms with difficult-to-maintain tolerances during extrusion.

Once the extruded insert 14 has hardened, the insert 14 is placed into a mold. Liquid material for forming the blade 12, such as liquid urethane, is poured into the mold holding the insert 14. The liquid blade material hardens on the insert 14 and molds the insert 14 in situ with the blade body 13. With reference to FIG. 3, the recesses 28 may be free of sharp corners, edges, and/or other sudden changes in the geometry which reduces the opportunity for air bubbles to become trapped in the recesses 28 as the liquid blade material is poured into the mold and enters the recesses 28. For example, each recess 28 may have an undulating inner portion 30 with the concave surface 108 connected to a pair of convex surfaces 106 at inflection points 122. The uninterrupted, undulating inner portion 30 thereby defines at least a portion of the recess 28 using the uninterrupted concave and convex surfaces 106, 108 rather than sharp corners, sharp edges, or other sudden changes in geometry as used in some conventional scraper blades. As shown in FIG. 3, the undulating inner portion 30 lacks sharp changes in geometry that could magnify the effect of dirt or other debris being present in the recess 28. The recess 28 is therefore more forgiving because the effect of any dirt or other debris in the recesses 28 is not magnified by sharp corners or other sudden changes in geometry which may occur in conventional scraper blades. Further, the uninterrupted, undulating inner portion 30 may gently guide air bubbles out of the recesses 28 as the recesses 28 are filled with liquid blade material. In this manner, the insert recesses 28 provide a more robust scraper blade 10 by reducing the likelihood of air bubbles being trapped between the blade projections 26 and the insert recesses 28 during manufacture which could interfere with molding of the blade 12 to the insert 14.

With reference to FIGS. 3 and 5, the recesses 28 and the projections 26 engaged therewith are laterally recessed within the thickness of the side wall portions 22, 24 to maximize the lateral thickness of blade leg portions 21, 23 and maximize the tensile strength of the leg portions 21, 23. More specifically, the insert side wall portions 22, 24 have a thickness varying between a maximum thickness 140 and a minimum thickness 142. With reference to FIG. 5, the recess enlarged regions 102 and the projection enlarged end portions 112 received therein are positioned within the maximum wall thickness 142 of the insert 14. Because the engaged recessed enlarged regions 102 and the projection enlarged end portions 112 are disposed within the insert side wall portions 22, 24, the interlocking projections 26 and recesses 28 provide a secure connection between the blade body 13 and the insert 14 without laterally extending arms that decrease the lateral thickness (and corresponding tensile strength) of some conventional scraper blades.

With reference to FIG. 2, a schematic view is provided of the scraper blade 10 in use with a conveyor belt system 54 having a conveyor belt 56 and a wheel 58. The scraper blade insert 14 has a mounting slot 59 between the side wall portions 22, 24 of the insert 14 (see FIG. 3), and the scraper blade 10 is mounted to the tensioning mechanism 50 by connecting the insert 14 to an elongate member 55 of the tensioning mechanism 50 extending across the conveyor belt 56. Specifically, an operator slides the scraper blade 10 onto a rib 52 of the elongate member 55 so that the rib 52 is received in the mounting slot 59 of the insert 14. The insert mounting slot 59 and tensioning mechanism rib 52 have mating features such as a T-shaped or dovetail-shaped projection and recesses that restrict movement of the scraper blade 10 to sliding movement onto or off of the rib 52. To capture the scraper blade 10 on the rib 52, an operator advances a pair of pins through cutouts 61, 63 (see FIG. 1) in the blade 12 and insert 14 and into openings of the rib 52. The pins prevent the scraper blade 10 from sliding off of the rib 52 and maintain the scraper blade 10 on the tensioning mechanism 50, as is generally known. It will be appreciated that the scraper blade 10 may be connected to tensioning mechanism 50 or other support structure using a variety of approaches instead of or in addition to the engaged rib 52 and mounting slot 59 discussed above. In another application, the scraper blade 10 may be used at a secondary position along the return strand of the conveyor belt 56 for removal of foreign fluids and/or particles.

Figure 4:
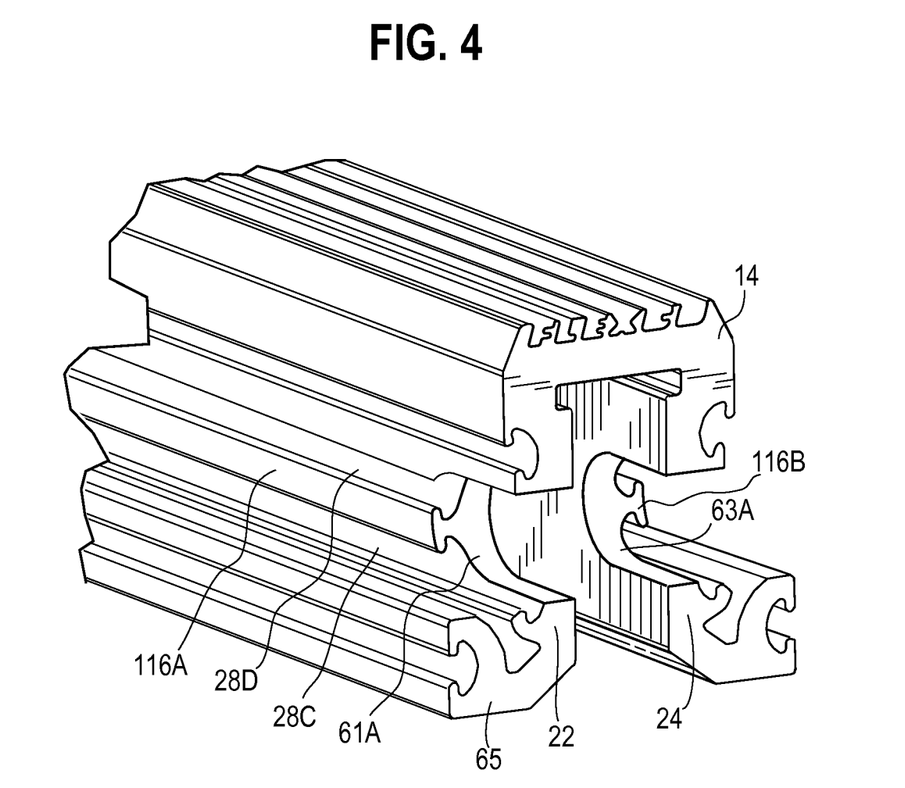
FIG. 4 is a perspective view of the insert of FIG. 1 showing a cutout in the end of the insert.

With reference to FIG. 4, the side wall portions 22, 24 of the insert 14 have cutouts 61A, 63A sized to permit passage of the pins into the rib 52 of the tensioning mechanism 50. The cutouts 61A, 63A extend inward from sides 65 (see FIG. 1) of the insert 14 and prevent a pair of recesses 28C, 28D on each leg portion 22, 24 from extending the entire length of the scraper blade 10. The cutouts 61A, 63A also interrupt the dividers 116A, 116B that form portions of the neckdown regions 100 of each of the recesses 28C, 28D. The cutouts 61A, 63A extend inwardly from the sides 65 of the insert 14 sufficiently far to permit passage of the pins to retain the scraper blade 10 on the tensioner mechanism rib 52 while permitting some variation in the overall length of the blade 10 and/or the length of the tensioner mechanism rib 52, such as due to manufacturing tolerances or changes in the temperature of the scraper blade 10.

As shown in FIG. 2, the tensioning mechanism 50 urges the blade 10 in direction 62 and presses a tip 64 of the blade 12 into engagement with the conveyor belt 64. The pressing of the blade tip 64 against the conveyor belt 56 produce contact forces in direction 82 on the tip 64 a distance 73 above a center 75 of the tensioning mechanism elongate member 55. The contact forces in direction 82 on the tip 64 produce a moment 90 acting on the blade body 13. With reference to FIG. 5, the moment 90 tends to pull the blade leg portion 23 away from the insert side wall portion 24 generally in direction 121.

Returning to FIG. 2, as the wheel 58 turns in direction 60, conveyed material 70 encounters the blade tip 64 and is scraped off of the conveyor belt 56. The friction of the conveyor belt 56 moving past the tip 64 produces friction forces in direction 72 on the tip 64 the distance 73 above the center 75 of the elongate member 55. The friction forces in direction 72 on the tip 64 produce a moment 74 on the blade body 13. With reference to FIG. 5, the moment 74 tends to pull the blade leg portion 21 away from the insert side wall portion 22 generally in direction 120. Returning to FIG. 2, the conveyor belt 56 may have one or more fasteners 76 joining ends 78, 80 of the conveyor belt 56 from previous repairs to the conveyor belt 56. As the wheel 58 rotates in direction 60 to drive the conveyor belt 56, the fastener 76 strikes the blade tip 64 and causes jarring forces in direction 82 a distance 77 away from the center 75 of the elongate member 55. The jarring forces in direction 82 contribute to the moment 74 and further tend to pull the blade leg portion 21 away from the insert side wall 22, as shown in FIG. 5.

Thus, the forces and moments acting on the blade 12 during conveyor belt operations including loading that tends to pull the leg portions 21, 23 of the blade 12 in respective directions 120, 121 away from the side wall portions 22, 24 of the insert 14. However, the engaged projections 26 and recesses 28 form multiple anchor points along each of the insert side wall portions 22, 24 that resist movement of the blade leg portions 21, 23 away from the insert side wall portions 22, 24.

With reference to FIGS. 3 and 5, the insert 14 has feet 91, 92 extending outwardly from the side wall portions 22, 24. The feet 91, 92 have recesses 91A, 92A (see FIG. 3) that receive projections 91B, 92B (see FIG. 5) of the blade leg portions 21, 23. Further, the feet 91, 92 have toes 93 with recesses 94 therein that receive projections 94A of the blade leg portions 22, 24. Thus, the interlocking projections 26, 91B, 92B, 94A and recesses 28, 91A, 91B, 94 of the blade body 13 and the insert 14 provide secure engagement of the blade leg portions 21, 23 to the insert 14 along the insert side wall portions 22, 24 and all the way down to a lower end 99 of the insert 14.

As shown in FIG. 5, the insert feet 91, 92 have laterally outer surfaces 95, 96 and the blade body leg portions 21, 23 have inwardly facing surfaces 21C, 23C that extend along the toe laterally outer surfaces 95, 96. The blade leg portions 21, 23 may therefore fully cover the lateral surfaces of the insert 14 and protect the insert 14 from the surrounding environment, which may corrode or damage the insert 14. With reference to FIG. 3, the insert feet 91, 92 have lower surfaces 97, 98 that contact or are close to the elongate member 55 of the tensioning mechanism 50 such that the insert lower surfaces 97, 98 are also protected from the surrounding environment.

With reference to FIG. 3, the insert 14 has a connector portion 130 connecting the side wall portions 22, 24. The connector portion 130 has upper overhang surfaces 131 and upper angled surfaces 133 that support the blade body leg portions 21, 23 as the leg portion 21, 23 are tensioned, compressed, and bent during conveyor operations as discussed above. The surfaces 131, 133 intersect at corner 135 at an obtuse angle 135A to minimize stress concentrations caused by the corner 135 in the blade body 13.

The connector portion 130 also includes the character portion 42 that forms at least a portion of an alphanumeric character. More specifically, the character portion 42 includes recesses 134 with surfaces 136 that form a partial periphery of one or more alphanumeric characters. For example, the recess 134A has surfaces 136 that define a portion of the outer profile of the letter "F." With reference to FIG. 5, the character portion 40 of the blade body 13 has projections 137 extending into the recesses 134 of the insert character portion 42. The projections 137 include projection 137A extending into the recess 134A. The projection 137A and the recess 134A have engaged surfaces 139, 136 that both define a portion of the outer profile of the letter "F." With reference to FIG. 3, the recess 134B has surfaces 136 that define a partial periphery of the letter "L" and so on. Thus, the cooperating recesses 134 and projections 137 of the blade body 13 and the insert 14 spell out the word "FLEXCO."

Figure 6:
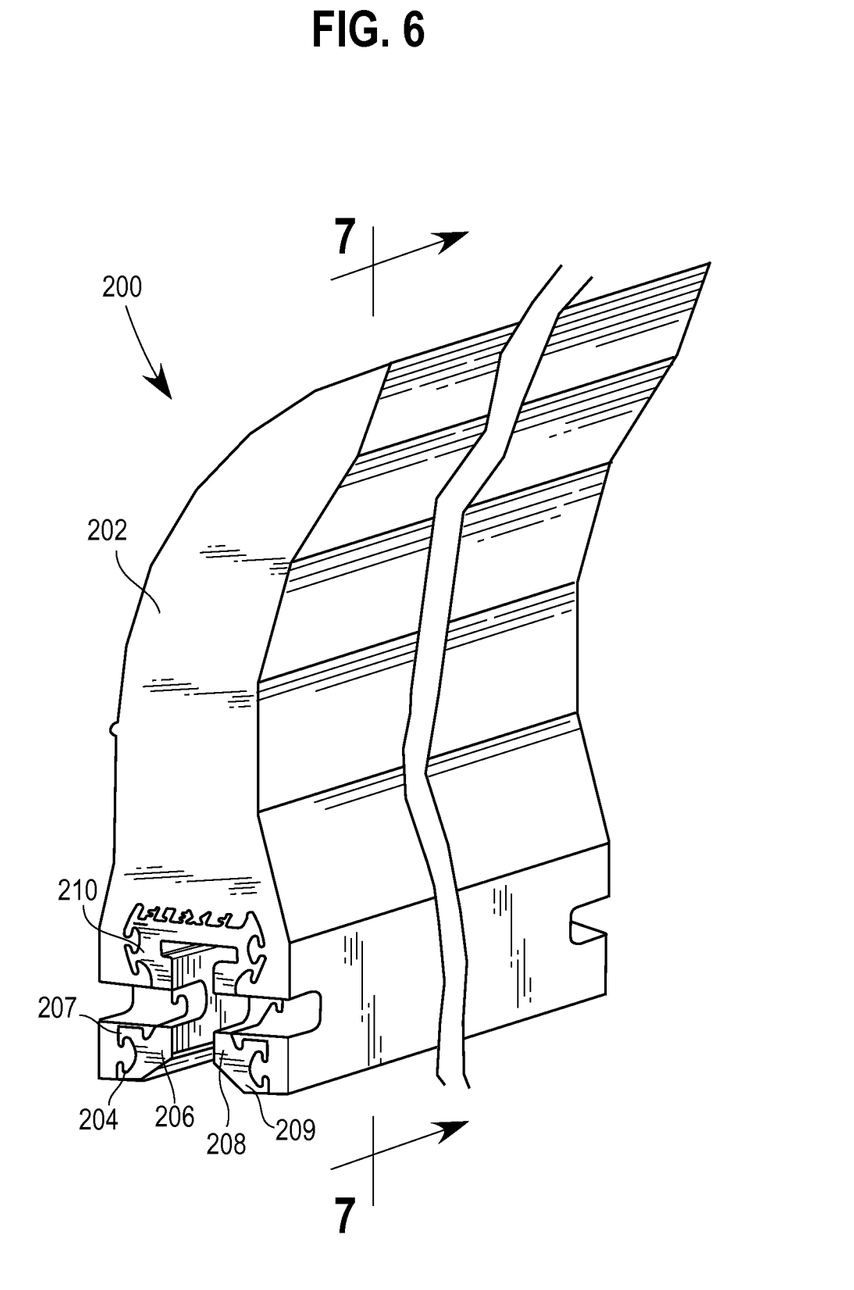
FIG. 6 is a perspective view of another scraper blade having a blade molded on an insert.
Figure 7:
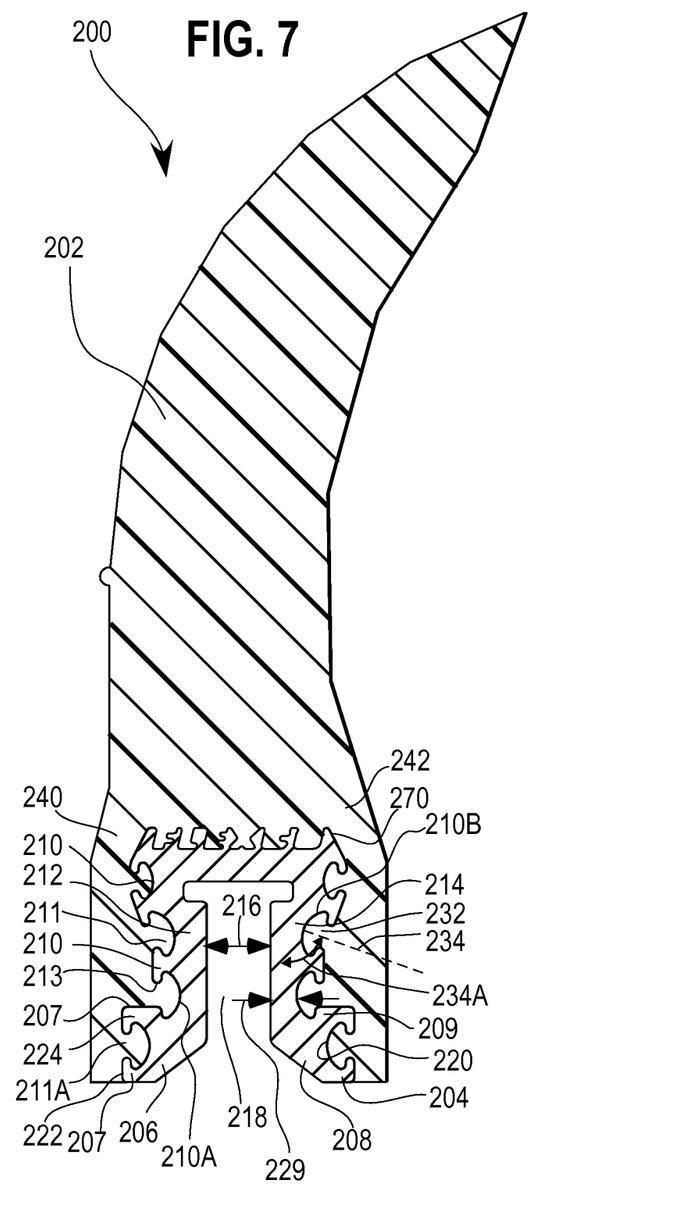
FIG. 7 is a cross-sectional view taken along line 7-7 in FIG. 6 showing projections of the blade engaged with recesses of the insert.

With reference to FIGS. 6 and 7, a scraper blade 200 is shown that is similar in many respects to the scraper blade 10 such that the differences between the two will be highlighted. The scraper blade 200 includes a blade 202 secured to an insert 204 having a different shape than the insert 14. For example, the insert 204 includes side wall portions 206, 208 spaced apart by a distance 216 which forms a gap 218 for receiving the rib 52 of the tensioning mechanism 50. The side wall portions 206, 208 have recesses 210 and neckdown regions 213 for receiving projections 211 of the blade 202 and feet 207, 209 extending laterally outward from the side wall portions 206, 208. With reference to FIG. 7, the feet 207, 209 have recesses 220 with neckdown regions 222 for receiving lower projections 211A. The insert 204 has dividers 224 between recesses 210A of the side wall portions 212, 214 and the recesses 220 of the feet 207, 209. The dividers 224 include at least a portion of the neckdown regions 213, 222 of the recesses 210A, 220.

With reference to FIG. 7, another difference between the scraper blades 10, 200 is that the insert 204 of the scraper blade 200 has an upper portion 270 that is more tapered than an upper portion 271 (see FIG. 3) of the insert 14. The insert 204 has a minimum predetermined thickness 229 to ensure that the insert 204 is sufficiently durable. To accommodate the more tapered shape of the insert upper portion 270 while preserving the minimum predetermined thickness 229, the insert 204 has an angled upper recesses 210B that optimally orients the associated blade projection 211. More specifically, the blade projections 211 each have a neck 232 with a length along an axis 234. The upper recesses 210B are configured to orient the neck axis 234 of the corresponding projections 211 to extend at an angle 234A relative to the insert side wall portions 212, 214. Although the projection neck axis 234 extends at the angle 234A, the projection neck 232 is placed primarily in tension when leg portions 240, 242 of the blade 202 are subjected to loading during conveyor operations that attempts to pull the leg portions 240, 242 away from the insert side walls 212, 214.

Figure 8:
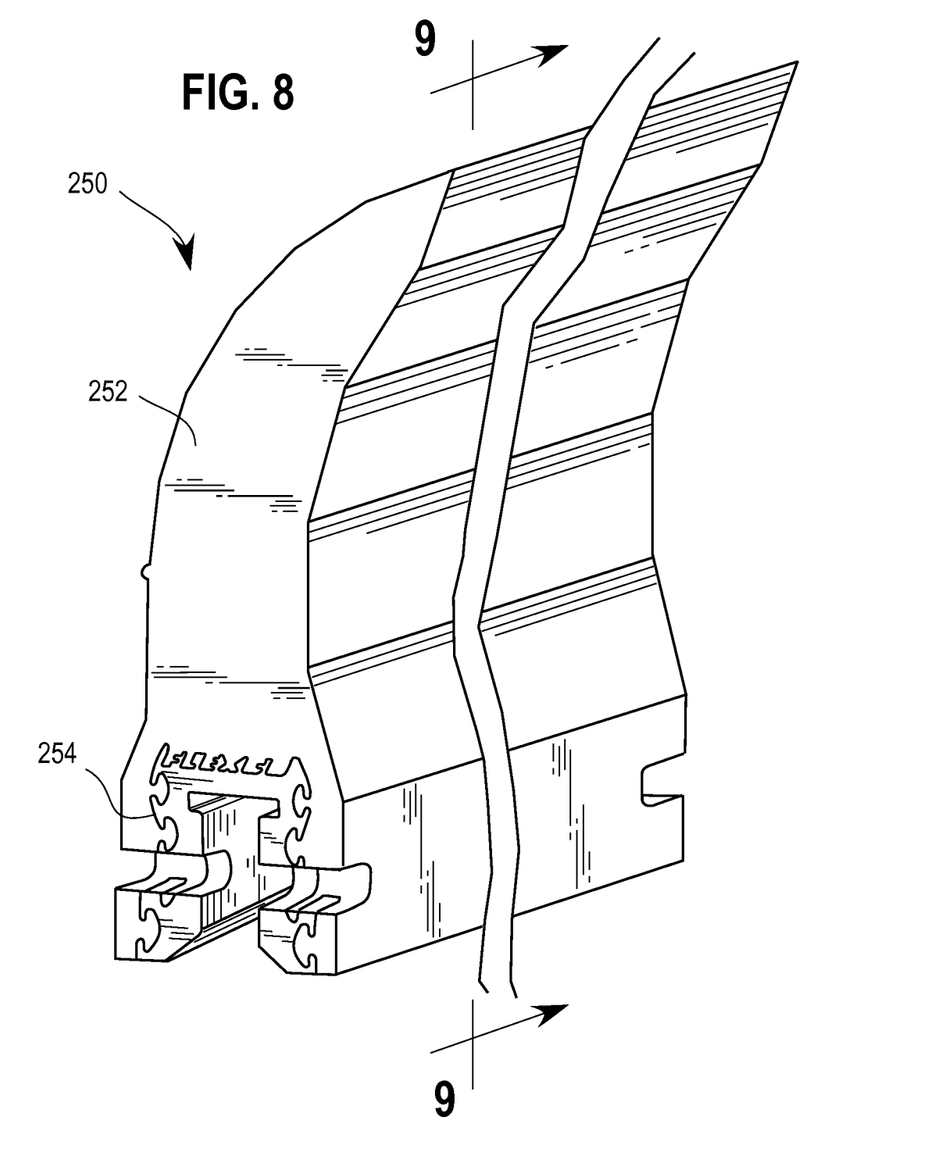
FIG. 8 is a perspective view of another scraper blade having a blade molded on an insert.
Figure 9:
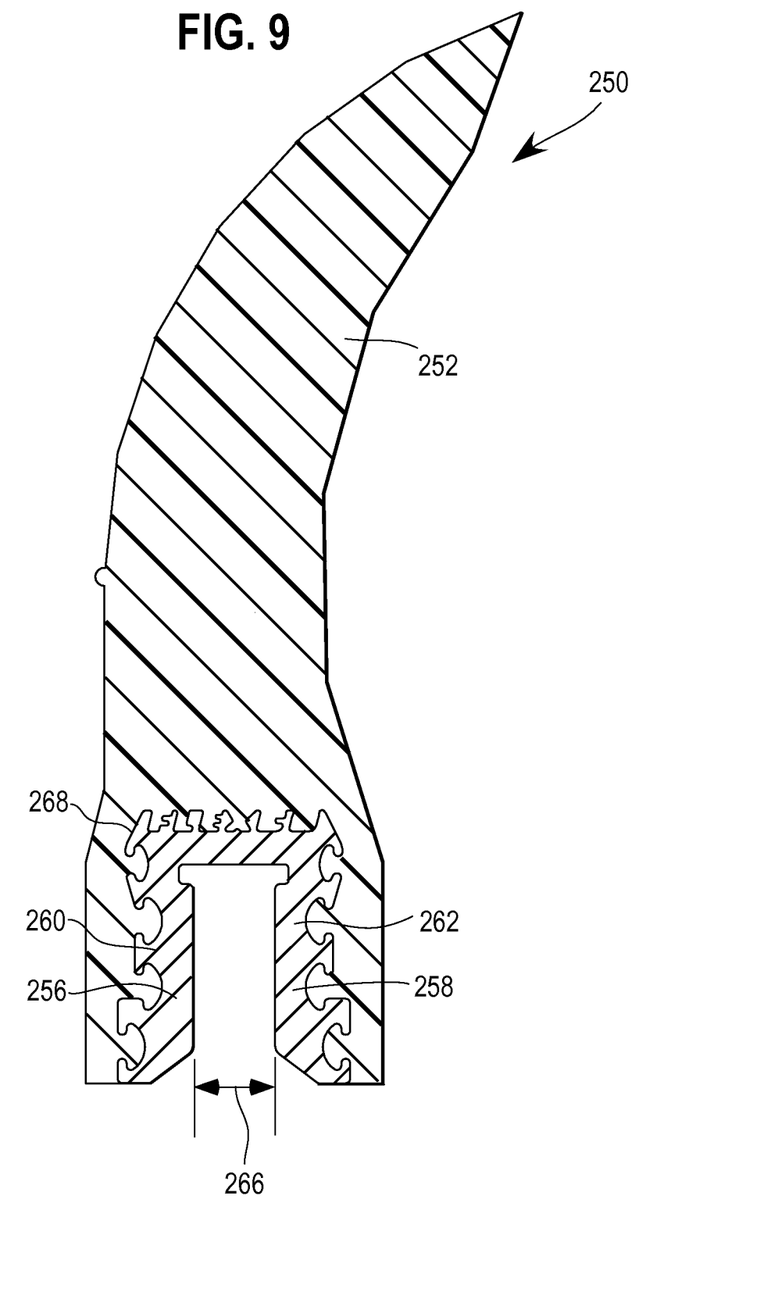
FIG. 9 is a cross-sectional view taken along line 9-9 in FIG. 8.

With reference to FIGS. 8 and 9, another scraper blade 250 is shown that is similar in many respects to scraper blade 200 discussed above such that differences between the two will be highlighted. The scraper blade 250 includes a blade 252 and an insert 254 to which the blade 252 is molded. The insert 254 has side wall portions 256, 258 having a similar minimum thickness as the minimum thickness 229 of the side wall portions 206, 208. However, the side wall portions 256, 258 are separated by a distance 266 larger than the distance 216. Due to the increased distance 266 and similar thickness of the wall portions 256, 258 with the wall portions 206, 208, the insert 254 has an upper end 268 with a less tapered shape than the upper portion 270 (see FIG. 7) of the scraper blade 200.

While there have been illustrated and described particular embodiments of the present invention, it will be appreciated that numerous changes and modifications will occur to those skilled in the art and it is intended that all those changes and modifications fall within the true spirit and scope of the present invention.

What is claimed is:

1. A scraper blade for a conveyor belt, the scraper blade comprising:
    a molded blade body of resilient material;
    an upper portion of the blade body including a scraping tip end thereof for engaging the conveyor belt;
    a lower portion of the blade body having a pair of laterally spaced depending leg portions;
    an insert molded in situ with the blade body;
    a pair of laterally spaced side wall portions of the insert having variable wall thicknesses and laterally outward facing sides that extend along corresponding inwardly facing sides of the blade body depending leg portions;
    a slot of the insert between the insert laterally spaced side wall portions;
    a plurality of recesses in each of the insert side wall portions that have an undercut configuration, each of the recesses having opposing curved surface portions above and below one another along the respective insert side wall portions; and
    a plurality of projections of the blade body lower portion at the laterally inward facing sides that extend laterally inward and fill the corresponding recesses in which the projections are received to keep the blade body and insert connected together under loading during conveyor belt operations.

2. The scraper blade of claim 1 wherein the insert includes offset lower foot portions extending in opposite lateral directions from the respective spaced side wall portions.

3. The scraper blade of claim 1 wherein the insert has a lower end portion with laterally outward facing sides and the depending leg portions of the blade body extend along and cover the laterally outward facing sides of the insert lower end portion.

4. The scraper blade of claim 1 wherein, in profile, the plurality of recesses having the undercut configuration have substantially the same size and shape.

5. The scraper blade of claim 1 wherein the plurality of recesses of the insert side wall portions are free of sharp edges and sharp corners.

6. The scraper blade of claim 1 wherein the insert is made of a metallic material.

7. The scraper blade of claim 1 wherein the slot of the insert is a mounting slot.

8. A scraper blade for a conveyor belt, the scraper blade comprising:
    a molded blade body of resilient material;
    an upper portion of the blade body including a scraping tip end thereof for engaging the conveyor belt;
    a lower portion of the blade body having a pair of laterally spaced depending leg portions;
    an insert molded in situ with the blade body;
    a pair of laterally spaced side wall portions of the insert having variable wall thicknesses and laterally outward facing sides that extend along corresponding inwardly facing sides of the blade body depending leg portions;
    a slot of the insert between the insert laterally spaced side wall portions;
    a plurality of recesses in each of the insert side wall portions that have an undercut configuration; and
    a plurality of projections of the blade body lower portion at the laterally inward facing sides that extend laterally inward and fill the corresponding recesses in which the projections are received to keep the blade body and insert connected together under loading during conveyor belt operations,
    wherein the plurality of recesses include neckdown regions that face laterally outward and the projections have narrow neck portions that extend laterally inward in the neckdown regions; and
    the recesses have enlarged recessed regions and the projections have corresponding enlarged lateral end portions in the enlarged recessed regions.

9. The scraper blade of claim 8 wherein the side wall portions extend vertically generally orthogonal to the laterally extending projection neck portions.

10. The scraper blade of claim 8 wherein the plurality of neckdown regions are generally vertically aligned along each of the insert side wall portions.

11. A scraper blade for a conveyor belt, the scraper blade comprising:
    a molded blade body of resilient material;
    an upper portion of the blade body including a scraping tip end thereof for engaging the conveyor belt;
    a lower portion of the blade body having a pair of laterally spaced depending leg portions;
    an insert molded in situ with the blade body;
    a pair of laterally spaced side wall portions of the insert having variable wall thicknesses and laterally outward facing sides that extend along corresponding inwardly facing sides of the blade body depending leg portions;
    a slot of the insert between the insert laterally spaced side wall portions;
    a plurality of recesses in each of the insert side wall portions that have an undercut configuration; and
    a plurality of projections of the blade body lower portion at the laterally inward facing sides that extend laterally inward and fill the corresponding recesses in which the projections are received to keep the blade body and insert connected together under loading during conveyor belt operations,
    wherein the insert includes offset lower foot portions extending in opposite lateral directions from the respective spaced side wall portions, and the offset lower foot portions each include at least one recess having an undercut configuration and a projection extending laterally inward into and filling the recess.

12. A scraper blade for a conveyor belt, the scraper blade comprising:
    a molded blade body of resilient material;
    an upper portion of the blade body including a scraping tip end thereof for engaging the conveyor belt;
    a lower portion of the blade body having a pair of laterally spaced depending leg portions;

an insert molded in situ with the blade body;
a pair of laterally spaced side wall portions of the insert having variable wall thicknesses and laterally outward facing sides that extend along corresponding inwardly facing sides of the blade body depending leg portions;
a slot of the insert between the insert laterally spaced side wall portions;
a plurality of recesses in each of the insert side wall portions that have an undercut configuration; and
a plurality of projections of the blade body lower portion at the laterally inward facing sides that extend laterally inward and fill the corresponding recesses in which the projections are received to keep the blade body and insert connected together under loading during conveyor belt operations,
wherein the plurality of recesses in one of the insert side wall portions includes a pair of adjacent recesses having neckdown regions thereof; and
a divider portion of the one insert side wall portion having a tongue portion disposed between the pair of recesses and having a pair of lip portions that each extend transverse to the tongue portion oppositely each other to form neckdown regions of the pair of recesses.

13. A scraper blade for a conveyor belt, the scraper blade comprising:
a molded blade body of resilient material;
an upper portion of the blade body including a scraping tip end thereof for engaging the conveyor belt;
a lower portion of the blade body having a pair of laterally spaced depending leg portions;
an insert molded in situ with the blade body;
a pair of laterally spaced side wall portions of the insert having variable wall thicknesses and laterally outward facing sides that extend along corresponding inwardly facing sides of the blade body depending leg portions;
a slot of the insert between the insert laterally spaced side wall portions;
a plurality of recesses in each of the insert side wall portions that have an undercut configuration; and
a plurality of projections of the blade body lower portion at the laterally inward facing sides that extend laterally inward and fill the corresponding recesses in which the projections are received to keep the blade body and insert connected together under loading during conveyor belt operations,
wherein the side wall portions of the insert include T-shaped projecting portions separating recesses along the side wall portions of the insert.

14. A scraper blade for a conveyor belt, the scraper blade comprising:
a molded blade body of resilient material;
an upper portion of the blade body including a scraping tip end thereof for engaging the conveyor belt;
a lower portion of the blade body having a pair of laterally spaced depending leg portions;
an insert molded in situ with the blade body;
a pair of laterally spaced side wall portions of the insert having variable wall thicknesses and laterally outward facing sides that extend along corresponding inwardly facing sides of the blade body depending leg portions;
a slot of the insert between the insert laterally spaced side wall portions;
a plurality of recesses in each of the insert side wall portions that have an undercut configuration; and
a plurality of projections of the blade body lower portion at the laterally inward facing sides that extend laterally inward and fill the corresponding recesses in which the projections are received to keep the blade body and insert connected together under loading during conveyor belt operations,
wherein the plurality of recesses of the insert side wall portions having the undercut configuration include undulating surfaces and the plurality of projections have complimentary configurations to that of the recesses.

15. A scraper blade for a conveyor belt, the scraper blade comprising:
a molded blade body of resilient material;
an upper scraping tip of the blade body for engaging the conveyor belt;
a lower pair of laterally spaced leg portions of the blade body;
a rigid insert molded in situ with the blade body and having a pair of laterally spaced side wall portions with laterally outward facing sides that extend along corresponding inwardly facing sides of the blade body leg portions;
a slot of the insert between the insert spaced side wall portions; and
a plurality of interlocking undercut recesses and complimentary projections of the insert side wall portions and the blade body leg portions that are recessed laterally into the insert side wall portions to maximize the lateral thickness of the blade body leg portions,
wherein the undercut recesses each include a narrow opening at the laterally outward facing side of the respective side wall portions and enlarged upper and lower portions above and below the narrow opening.

16. The scraper blade of claim 15 wherein the plurality of interlocking undercut recesses and complimentary projections include a plurality of interlocking recesses and projections that are recessed laterally into each of the insert side wall portions.

17. The scraper blade of claim 15 wherein the plurality of interlocking undercut recesses and complimentary projections includes a plurality of undercut recesses of the insert side wall portions that open laterally outward and a plurality of complimentary projections of the blade body lower leg portions that extend laterally inward and fill the recesses.

18. The scraper blade of claim 15 wherein the plurality of recesses include neckdown regions including the narrow opening that face laterally and the projections have narrow neck portions that extend laterally in the neckdown regions; and
the recesses have enlarged recessed regions and the projections have corresponding enlarged lateral end portions in the enlarged recessed regions.

19. The scraper blade of claim 15 wherein the insert includes offset lower foot portions extending in opposite lateral directions from the respective spaced wall portions.

20. The scraper blade of claim 19 wherein the insert offset lower foot portions and the blade body leg portions include at least one interlocking undercut recess and complimentary projection that are recessed laterally into the insert foot portion.

21. The scraper blade of claim 15 wherein the plurality of undercut recesses each include an undulating surface and the plurality of projections have complimentary configurations to that of the recesses.

22. A scraper blade for a conveyor belt, the scraper blade comprising:
a molded blade body of resilient material;
an upper scraping tip of the blade body for engaging the conveyor belt;
a lower pair of laterally spaced leg portions of the blade body;

a rigid insert molded in situ with the blade body and having a pair of laterally spaced side wall portions with laterally outward facing sides that extend along corresponding inwardly facing sides of the blade body leg portions;
a slot of the insert between the insert spaced side wall portions; and
a plurality of interlocking undercut recesses and complimentary projections of the insert side wall portions and the blade body leg portions that are recessed laterally into the insert side wall portions to maximize the lateral thickness of the blade body leg portions,
wherein the insert includes a portion connecting the insert side wall portions and the plurality of interlocking undercut recesses and projections of the insert side wall portions and the blade body leg portions are recessed laterally into the insert below the connecting portion.

23. The scraper blade of claim 22 wherein the connecting portion of the insert and the blade body include at least one undercut recess and a complimentary projection engaged therewith.

24. A scraper blade for a conveyor belt, the scraper blade comprising:
a molded blade body of resilient material;
an insert connected to the blade body and having a slot;
a pair of laterally spaced side wall portions of the insert on either side of the slot; and
an upper, laterally extending portion of the insert interconnecting the laterally spaced side wall portions and being configured to form partial peripheries of at least three alphanumeric characters oriented laterally adjacent one another along the insert upper, laterally extending portion.

25. The scraper blade of claim 24 wherein one of the blade body and the insert upper portion includes a recess and the other of the blade body and the insert upper portion includes a projection extending into the recess.

26. The scraper blade of claim 24 wherein at least one of the alphanumeric characters is a letter of the English alphabet.

27. The scraper blade of claim 24 wherein at least one of the alphanumeric characters is a number.

28. The scraper blade of claim 24 wherein the blade body and the insert include a plurality of recesses having an undercut configuration and projections in interlocking engagement with the recesses to keep the blade body and the insert connected together under loading during conveyor belt operation.

29. A scraper blade for a conveyor belt, the scraper blade comprising:
a molded blade body of resilient material;
a scraping tip of the blade body for engaging the conveyor belt;
a rigid insert molded in situ with the blade body;
lateral side portions of the rigid insert that extend along corresponding lateral side portions of the blade body; and
a plurality of interlocking undercut recesses and complimentary projections of each of the insert lateral side portions and the blade body lateral side portions that are recessed laterally into the insert lateral side portions,
wherein, in profile, at least two of the plurality of undercut recesses along each of the insert lateral side portions have substantially the same size and shape.

30. The scraper blade of claim 29 wherein the insert lateral side portions comprise laterally spaced side wall portions having a slot therebetween.

31. A scraper blade for a conveyor belt, the scraper blade comprising:
a molded blade body of resilient material;
a scraping tip of the blade body for engaging the conveyor belt;
a rigid insert molded in situ with the blade body;
lateral side portions of the rigid insert that extend along corresponding lateral side portions of the blade body; and
a plurality of interlocking undercut recesses and complimentary projections of the insert lateral side portions and the blade body lateral side portions that are recessed laterally into the insert lateral side portion,
wherein the plurality of undercut recesses include neckdown regions that face laterally and the projections have narrow neck portions that extend laterally in the neckdown regions; and
the recesses have enlarged recessed regions and the projections have corresponding enlarged lateral end portions in the enlarged recessed regions.

32. The scraper blade of claim 31 wherein the insert lateral side portions extend vertically generally orthogonal to the laterally extending projection neck portions.

33. A scraper blade for a conveyor belt, the scraper blade comprising:
a molded blade body of resilient material;
a scraping tip of the blade body for engaging the conveyor belt;
a rigid insert molded in situ with the blade body;
lateral side portions of the rigid insert that extend along corresponding lateral side portions of the blade body; and
a plurality of interlocking undercut recesses and complimentary projections of the insert lateral side portions and the blade body lateral side portions that are recessed laterally into the insert lateral side portions,
wherein the plurality of undercut recesses include pairs of recesses on the insert and the insert includes T-shaped projecting portions separating the pairs of recesses along the insert.

34. A scraper blade for a conveyor belt, the scraper blade comprising:
a molded blade body of resilient material;
a scraping tip of the blade body for engaging the conveyor belt;
a rigid insert molded in situ with the blade body;
lateral side portions of the rigid insert that extend along corresponding lateral side portions of the blade body; and
a plurality of interlocking undercut recesses and complimentary projections of the insert lateral side portions and the blade body lateral side portions that are recessed laterally into the insert lateral side portions,
wherein the plurality of undercut recesses each include an undulating surface and the plurality of projections have complimentary configurations to that of the recesses.

* * * * *